United States Patent
Davydov et al.

(10) Patent No.: US 8,739,291 B2
(45) Date of Patent: May 27, 2014

(54) SYSTEM AND METHOD FOR PROVIDING ACCESS TO OMA DRM PROTECTED FILES FROM JAVA APPLICATION

(75) Inventors: Alexander Davydov, Helsinki (FI); Michael Rhodes, Farnborough (GB); Jason Sharpe, Farnborough (GB)

(73) Assignee: Nokia Corporation, Espoo (FI)

( * ) Notice: Subject to any disclaimer, the term of this patent is extended or adjusted under 35 U.S.C. 154(b) by 1077 days.

(21) Appl. No.: 11/045,200

(22) Filed: Jan. 27, 2005

(65) Prior Publication Data

US 2006/0174347 A1 Aug. 3, 2006

(51) Int. Cl.
| | | |
|---|---|---|
| G06F 7/04 | (2006.01) | |
| G06F 17/30 | (2006.01) | |
| H04N 7/16 | (2011.01) | |

(52) U.S. Cl.
USPC .................................. 726/26; 726/27; 726/29

(58) Field of Classification Search
CPC ........................... G06F 21/10; H04L 2463/101
USPC ........................................................... 726/26
See application file for complete search history.

(56) References Cited

U.S. PATENT DOCUMENTS

| | | | | | |
|---|---|---|---|---|---|
| 5,987,454 | A  * | 11/1999 | Hobbs | .................................... | 1/1 |
| 6,499,035 | B1   | 12/2002 | Sobeski | | |
| 6,891,953 | B1 * | 5/2005 | DeMello et al. | ............... | 380/277 |
| 6,925,571 | B1 * | 8/2005 | Motoyama et al. | .............. | 726/22 |
| 7,159,116 | B2 * | 1/2007 | Moskowitz | .................... | 713/176 |
| 7,173,730 | B1 * | 2/2007 | Suzuki et al. | ................ | 358/1.16 |
| 7,280,956 | B2 * | 10/2007 | Cross et al. | ................... | 713/171 |
| 7,383,510 | B2 * | 6/2008 | Pry | ................................ | 715/745 |
| 7,421,411 | B2 * | 9/2008 | Kontio et al. | .................... | 705/52 |
| 7,475,246 | B1 * | 1/2009 | Moskowitz et al. | ........... | 713/169 |
| 8,181,255 | B2 * | 5/2012 | Bogot et al. | ...................... | 726/26 |
| 2002/0104023 | A1 * | 8/2002 | Hewett et al. | .................. | 713/201 |
| 2002/0161996 | A1 | 10/2002 | Koved et al. | | |

(Continued)

FOREIGN PATENT DOCUMENTS

| | | |
|---|---|---|
| EP | 1191422 A2 | 3/2002 |
| WO | WO 2006/054988 | 5/2006 |

OTHER PUBLICATIONS

Open Mobile Alliance—DRM; Digital Rights Management & DRM Content Format & Rights Expression Language & Download Architecture; Nov. 13, 2003.*

(Continued)

*Primary Examiner* — Christopher Brown
*Assistant Examiner* — James Turchen
(74) *Attorney, Agent, or Firm* — Alston & Bird LLP (57) ABSTRACT

A system and method for accessing content on an electronic device in an encrypted mode, a decrypted mode or a default mode. A request is transmitted to an application program interface to permit a requesting program to access at least one file. The request specifically identifies whether the requesting program wishes to access the file in an encrypted mode, a decrypted mode or a default mode. It is determined whether the specific form is supported by the application program interface being used by the system, whether the at least one file is protected; and whether the requesting program is permitted to access the at least one file. If the specific form is supported by the application program interface, if the at least one file is protected, and if the requesting program is permitted to access the at least one file, the at least one file is opened in the specific form for use by the requesting program.

20 Claims, 8 Drawing Sheets

(56) References Cited

U.S. PATENT DOCUMENTS

| | | | | |
|---|---|---|---|---|
| 2003/0120727 | A1* | 6/2003 | Mentchoukov | 709/203 |
| 2003/0126086 | A1* | 7/2003 | Safadi | 705/51 |
| 2005/0021747 | A1* | 1/2005 | Jave | 709/224 |
| 2005/0070257 | A1* | 3/2005 | Saarinen et al. | 455/414.1 |
| 2006/0064583 | A1* | 3/2006 | Birnbaum et al. | 713/164 |
| 2006/0265441 | A1* | 11/2006 | Andersson et al. | 708/200 |

OTHER PUBLICATIONS

PHP-Manual from "http://www.php.net/manual/en/function.parse-url.php" on Mar. 19, 2004 via Wayback Machine.*

Sending a variable in a link; Aug. 8, 2004; http://www.webmaster-talk.com/php-forum/13267-sending-a-variable-in-a-link.html; accessed Aug. 30, 2010.*

Problem with parameters in url in PHP; Aug. 15, 2002; http://www.webmasterworld.com/forum88/619.htm; accessed Aug. 30, 2010.*

Dialogue "Windows cannot open this file"; Accessed Nov. 28, 2012; Posted Nov. 29, 1999.*

Getting the hProcess via ShellExecuteEx API; Accessed Nov. 28, 2012; Posted Dec. 13, 2005.*

How to change or select which program starts when you double-click a file in Windows XP; Accessed Nov. 28, 2012; Windows XP release date—Oct. 25, 2001.*

Windows XP: The Complete Reference; Sep. 28, 2001; John R Levine; Osborne/McGraw-Hill.*

Performance Profile for an Embedded Java OMA DRM 2 Agent; Daniel Thull; Proceedings of the First International Conference on Automated Production of Cross Media Content for Multi-Channel Distribution (AXMEDIS'05); 0-7695-2348-X/05; 2005 IEEE.*

Digital Rights Management in a 3G Mobile Phone and Beyond; Thomas S. Messerges, Ezzat A. Dabbish; DRM'03, Oct. 27, 2003, Washington, DC, USA.Copyright 2003 ACM 1-58113-786-9/03/0010.*

International Search Report for Application PCT/IB2006/000145.

Office Action for Canadian Patent Application No. 2,596,022, dated May 18, 2011.

Supplemental European Search Report for Application No. 06755815.5, dated May 2, 2011.

European Communication for European Application No. 06 755 815.5, dated May 30, 2012.

Office Action for European Application No. 06 755 815 dated Sep. 13, 2013.

"*DrmManagerClient*;" Android Developers; retrieved on Jan. 22, 2014 from <http://developer.android.com/reference/android/drm/DrmManagerClient.html#checkRightsStatus%28android.net.Uri,%20int%29>.

"*What can PHP do?*" PHP: What can PHP do?—Manual; dated Apr. 5, 2013; retrieved on Apr. 9, 2013 from <http://www.php.net/manual/en/intro-whatcando.php>.

* cited by examiner

SYSTEM AND METHOD FOR PROVIDING ACCESS TO OMA DRM PROTECTED FILES FROM JAVA APPLICATION

FIELD OF THE INVENTION

The present invention relates generally to digital rights management and device management. More particularly, the present invention relates to the reading of protected files in either encrypted or decrypted form by applications.

BACKGROUND OF THE INVENTION

Open Mobile Alliance (OMA) Digital Rights Management (DRM) is a technology that allows control over the consumption of various media objects, such as ring tones, images, and other objects, by mobile terminals. DRM is a term used to describe a range of techniques that use information about rights and rights holders to manage copyright material and the terms and conditions on which the material is made available to users. More specifically, DRM involves the description, layering, analysis, valuation, trading, and monitoring of an owner's property rights to an asset. DRM covers the management of the digital rights to the physical manifestation of a work (e.g., a textbook) or the digital manifestation of a work (e.g., an Internet web page). DRM also covers the management of an asset whether the asset has a tangible or an intangible value. Current DRM technologies include languages for describing the terms and conditions for an asset, tracking asset usage by enforcing controlled environments or encoded asset manifestations, and closed architectures for the overall management of the digital rights. In OMA DRM technology, control is exercised by supplementing each media object with a rights object. The rights object defines rules according to which the media object is consumed.

OMA DRM technology is by used many mobile terminals for the protection of content images, sound files, videos, and other items. Unprotected files are stored in the file system in a plain text format, while protected files are encrypted. Then, it is assumed that whenever an application requests the content of a protected file, the DRM agent (a special system component) decrypts the file on the fly and provides the data to the requesting application. At the same time, an application can usually use a special API to read the same protected file in the encrypted form, bypassing the DRM agent.

Unfortunately, the access method described above is not always possible. This is because some APIs, such as Java APIs, were initially created without taking OMA DRM protection of content into account. This has resulted in a dilemma. When a Java application requests the content of an OMA DRM protected file, it is unclear whether the file's data should be passed to an application as is (i.e., encrypted), or whether the DRM agent should perform decryption beforehand. Currently, some Java applications, such as image viewers and music players, require protected files in plain text form. Other Java applications, however, such as file managers and electronic mail clients require protected files in encrypted form. Moreover, certain applications may require both types of access. For example, some image viewers may be able both to display OMA DRM protected images and to superdistribute them.

The situation discussed above is further complicated by the fact that the same Java application can use different Java APIs to open the same protected file. For example, Multimedia API (JSR 135) may play a music file, while File API (JSR 75) is used to copy it. In addition and, with regard to the OMA DRM protection of files, all Java APIs fall (with certain reservations) into one of two categories: "safe" APIs that do not allow an application to get hold of a protected file's content; and "unsafe" APIs that allow an application to do so.

There is therefore a need for a system that will allow an application to specify the form in which the protected file's content is to be read. This mechanism should be universal enough to be usable in virtually any Java APIs that can potentially access protected files as well as other APIs.

SUMMARY OF THE INVENTION

The present invention addresses the above-identified shortcomings by providing three additional types of file URLs that are used to specify the format in which the protected file's data is passed to an application. In order to avoid changes in existing APIs and to make the access method API-independent, a request to open a protected file in the particular form (decrypted or encrypted) is accomplished according to the present invention by adding an appropriate optional parameter to the end of the URL. As a result, the method can be used from any API that uses URLs to open files. According to one embodiment of the present invention, when opening an OMA DRM protected file through an API using a URL, an application can request one of three access modes—decrypted, encrypted or default. Additionally, the application may specify whether it intends to consume the content or just to preview it. For example, in the case of an image, the application may specify whether it intends to show the complete image to the user or just show a thumbnail of the image. With the present invention, applications such as MIDlets are therefore enabled to read OMA DRM protected files without changes in any current APIs.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
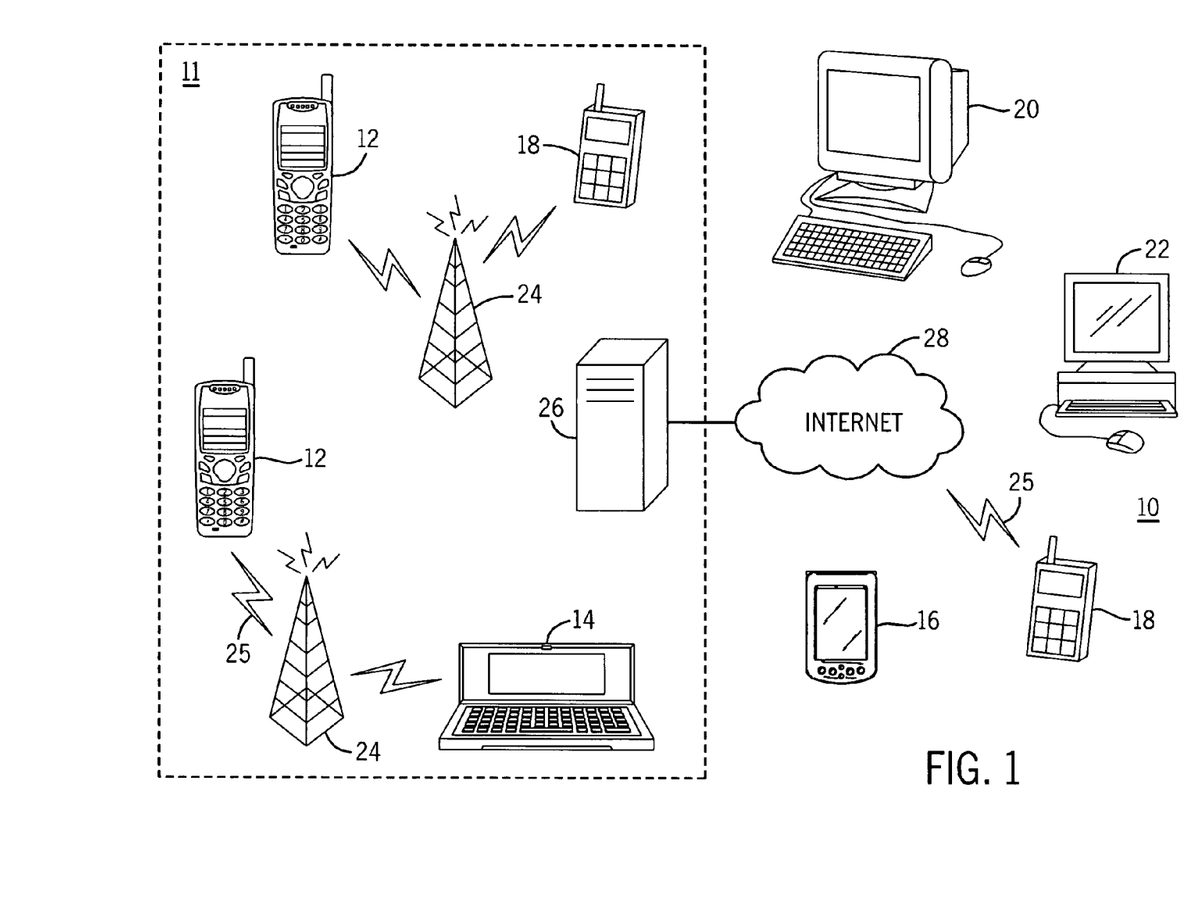
FIG. 1 is an overview diagram of a system within which the present invention may be implemented.

FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination personal digital assistant (PDA) and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
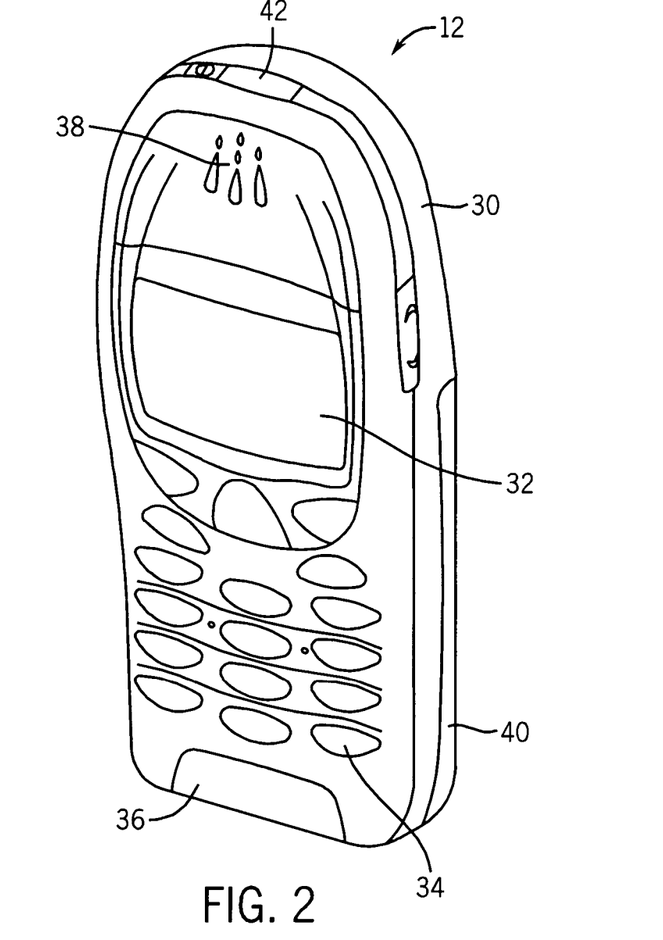
FIG. 2 is a perspective view of a mobile telephone that can be used in the implementation of the present invention.
Figure 3:
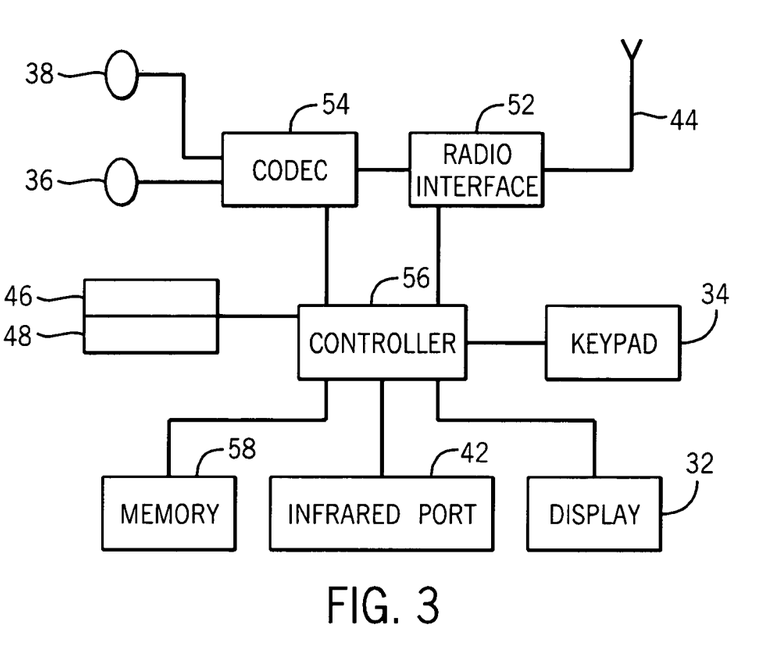
FIG. 3 is a schematic representation of the telephone circuitry of the mobile telephone of FIG. 2.

FIGS. 2 and 3 show one representative mobile telephone 12 within which the present invention may be implemented. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

According the principles of the present invention, a request to open a protected file in a particular form is accomplished by adding an optional parameter to the end of the URL request. According to one embodiment of the present invention, when opening an OMA DRM protected file through an API using a URL, an application can request one of three access modes—decrypted, encrypted or default. The application may also specify whether it intends to consume the content or just preview the content. The present invention may be used with virtually any API that uses URLs to access files, including but not limited to Java APIs.

The following is an example how one embodiment of the present invention operates when it is desired to read a file in a decrypted (plain text) mode. When an application attempts to open a file using a URL that starts with "file://" and ends either with "?drm=dec+'purpose'" or with "?drm=dec+'purpose'+preview" (where 'purpose' is one of the following: "display", "play", "print" or "execute"), this is interpreted as a request to open the file for reading of the content in the plain text form. Two such examples of this type of URL are as follows:

file:///E:/images/cat.jpg?drm=dec+play
file:///E:/sounds/mew.mp3?drm=dec+play+preview If a URL containing "?drm=dec+'purpose'" points to an object that is an OMA DRM protected file, and if the security policy of the mobile device allows the application to access this file, then the system opens the file in the decrypted mode. In this case, in all subsequent read operations on the file, the API implementation will return decrypted content. In other words, from the application's point of view, the read operation occurs as if the content were unprotected. If the security policy of the mobile device does not allow the application to access the protected file requested using a URL that contains "?drm=dec+'purpose'", a java.lang.SecurityException is thrown by an API method to which the URL was passed. Each decrypted mode URL contains the 'purpose' parameter "display", "play", "print" or "execute". The API implementation interprets the value of this parameter as an indication of an operation that an application is going to perform on a file being opened. The implementation then uses this parameter to check wither a corresponding OMA DRM permission exists for a given file and is valid. If a protected file does not have a valid permission for an indicated operation, the file is not opened and a java.lang.SecurityException is thrown.

On the other hand, if a URL containing "?drm=dec+'purpose'" points to an unprotected file, and the security policy of the mobile device allows the application to access this file, then the system opens the file in the default mode. In this situation, the file is opened in a read-only mode. If the security policy of the mobile device does not allow the application to access the unprotected file requested using a URL that ends with "?drm=dec+'purpose'", a java.lang.SecurityException is thrown by an API method to which the URL was passed.

If a URL that ends with "?drm=dec+'purpose'+'preview'" points to a DRM protected file, this is interpreted by the system as an indication that the application is not going to consume the content of the file(s). For example, the system may only exhibit a "thumbnail" of an image file instead of displaying a full and complete image. In this case, if the protected file has a <count> constraint in a relevant permission (or any other constraint that limits the number of times a file can be opened), the DRM agent does not decrease the counter. This is necessary because, in certain situations an application needs to manipulate the content, but such a preview does not ordinarily qualify as actual consumption of the file's content.

If a URL ends only with "?drm=dec+'purpose'" (without "preview") and the target file has a permission with the <count> constraint, the DRM agent decreases the counter. This means that the default behavior in the decrypted mode is to decrease the counter, and the application needs to specify explicitly when the counter does not need to be decreased. If a URL that ends with "?drm=dec+'purpose'+'preview'" points to a non-protected file, the "preview" parameter is ignored.

The described preview mechanism may not be available to untrusted applications. If such an application includes "preview" in a file URL, a java.lang.IllegalArgumentException is thrown.

Figure 4A:
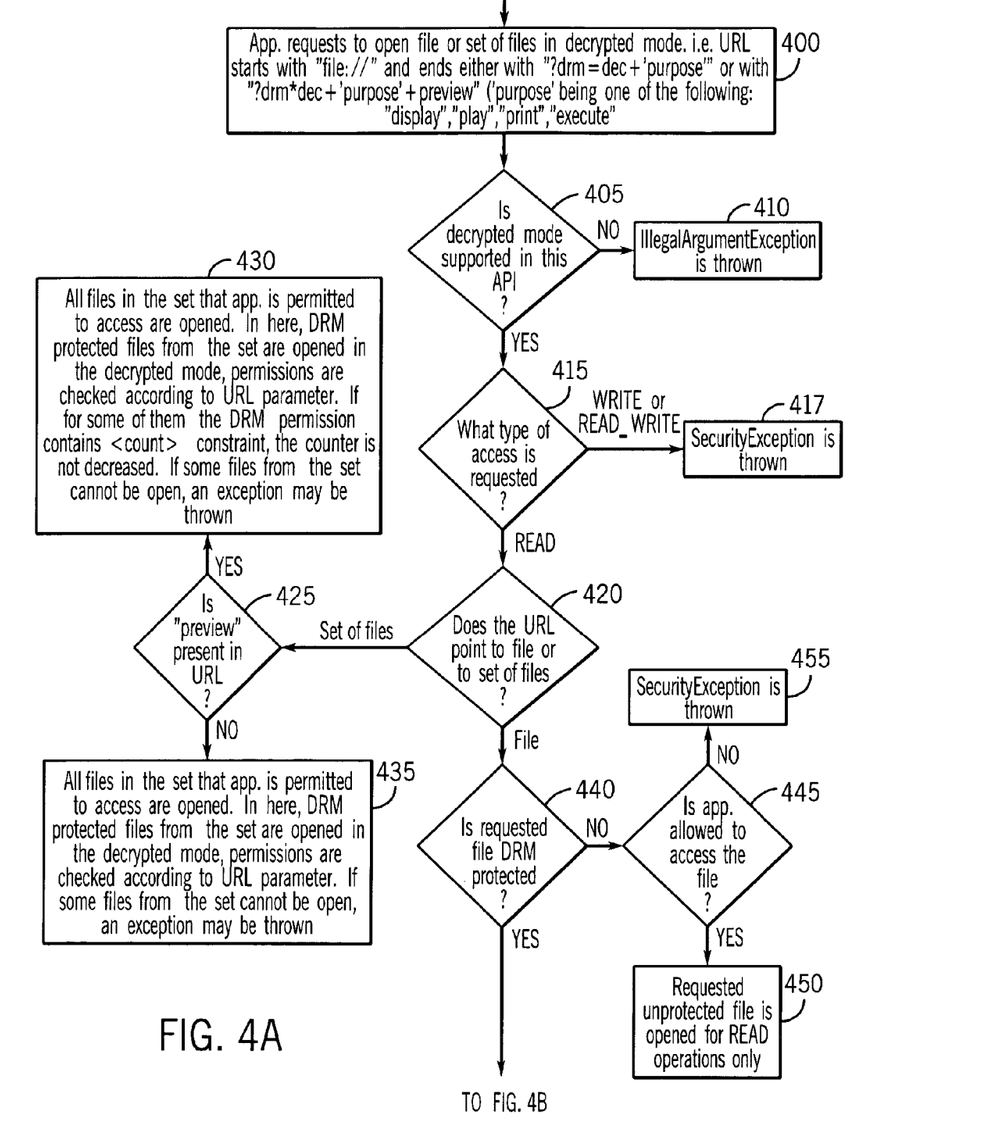
FIG. 4 is a flow chart showing the decision-making process involved in a situation where an application requests access in decrypted mode to a file or a plurality of files according to one embodiment of the invention.
Figure 4B:
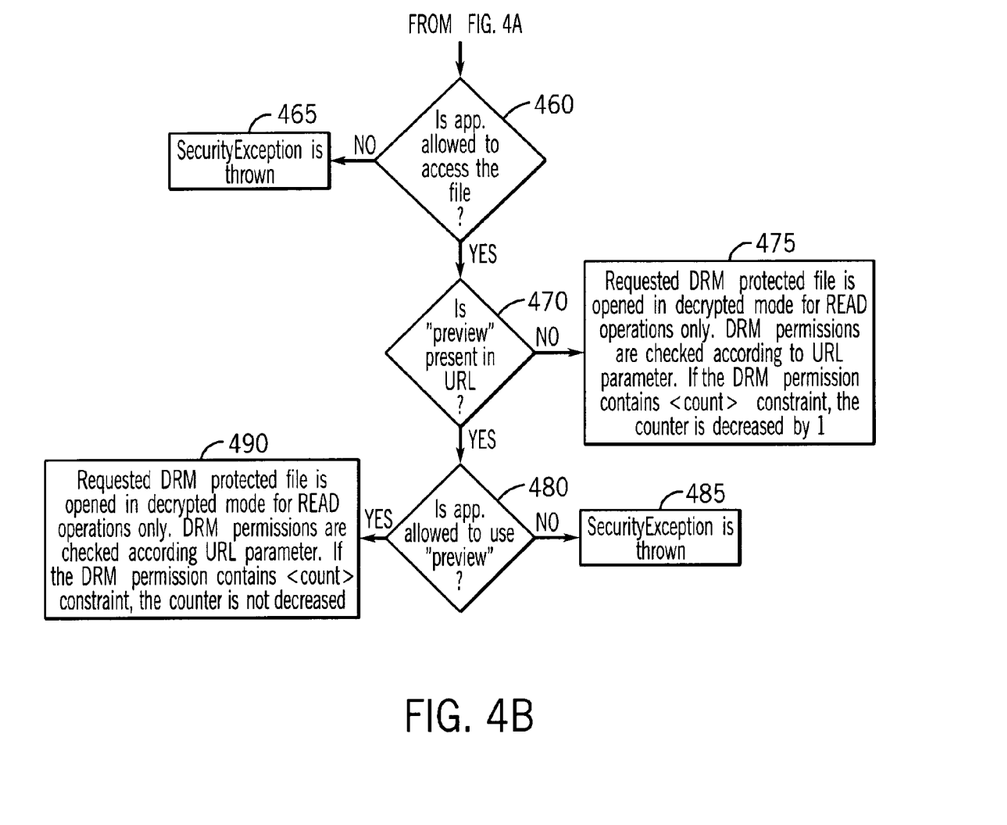

A flow chart depicting the decision-making process when an application requests access to a file in a decrypted mode is shown in FIG. 4. At step 400, the application attempts to open a file or a set of files in the decrypted mode. At step 405, it is determined whether the decrypted mode is supported in the particular API being used. If decrypted mode is not supported, then at step 410, an IllegalArgumentException is thrown. If decrypted mode is supported, then at step 415 it is determined what type of access is requested by the application. If the application is requesting WRITE or READ_WRITE access, then a SecurityException is thrown at step 417.

If, on the other hand, the application is requesting READ access, then at step 420 it is determined whether the URL at issue points to a single file or a set of files. If the URL only points to a single file, then at step 440 it is determined whether the requested file is DRM protected. If it is not DRM protected, then at step 445 it is determined whether the application is allowed to access the file. If the application is permitted to access the file, then at step 450 the requested, unprotected file is opened for READ operations only. If the application is not permitted to access the file, then at step 455 a SecurityException is thrown.

If, on the other hand, the requested file is DRM protected, then at step 460 it is determined whether the application is permitted to access the file. If it is not allowed to access the file, then at step 465 a SecurityException is thrown. If the application is permitted to access the file, then at step 470, it is determined whether a "preview" code is present in the URL. If a "preview" code is not present, then at step 475, the requested file is opened in the decrypted mode for READ operations only. If, for some of the files, the DRM permission contains a <count> constraint, the counter is decreased by one. If a "preview" code is present in the URL, then at step 480 it is determined whether the application is permitted to use the "preview" function. It should also be noted that this determination is also made when the URL points to a set of files and a "preview" code is present for at least one of the files. If the application is permitted to use the "preview" function, then an IllegalArgumentException is thrown at step 485. If the application can use the "preview" function, then at step 490 the requested DRM protected file is opened in decrypted form for READ operations only. If the DRM permission contains a <count> constraint, then the counter is not decreased.

Returning to step 420, if the URL points to a set of files, then at step 425 it is determined whether a "preview" code is present in the URL. If such a code is present, then at step 430, all files in the set that the application is permitted to access are opened. In this case, DRM protected files from the set are opened in the decrypted mode. If, for some of the files, the DRM permission contains a <count> constraint, the counter is not decreased. It should also be noted that if some of the files cannot be opened, an exception may also be thrown. On the other hand, if a "preview" code is not present in the URL, then at step 435, all files in the set that the application is permitted to access are opened. DRM protected files from the set are opened in the decrypted mode. If, for some of the files, the DRM permission contains a <count> constraint, the counter is decreased by one. It should also be noted that if some of the files cannot be opened, an exception may also be thrown. It should be noted that, for steps 425 and 430, each individual file may undergo the same decision-making process as is depicted in steps 440 through 490.

The following is an example of how one embodiment of the present invention operates when it is desired to read a file in an encrypted form. When an application attempts to open a protected file using a URL that starts with "file://" and ends with "?drm=enc", this is interpreted by the system as a request to open a file for the reading of the content in the encrypted form. An example URL is file:///E:/images/cat.jpg?drm=enc.

If a URL ending with "?drm=enc" points to an OMA DRM protected file, and if the security policy of the mobile device allows the application to access the file, then the system opens the file in the encrypted mode. In all subsequent read operations of the file performed by the application, the system will return content in the encrypted ("as is") form. If the security policy of the mobile device does not permit the application to access the protected file requested using a URL that ends with "?drm=enc", then java.lang.SecurityException is thrown by an API method to which the URL was passed. If a URL ending with "?drm=enc" points to an unprotected file, then java.lang.SecurityException is thrown by an API method to which the URL was passed.

Figure 5:
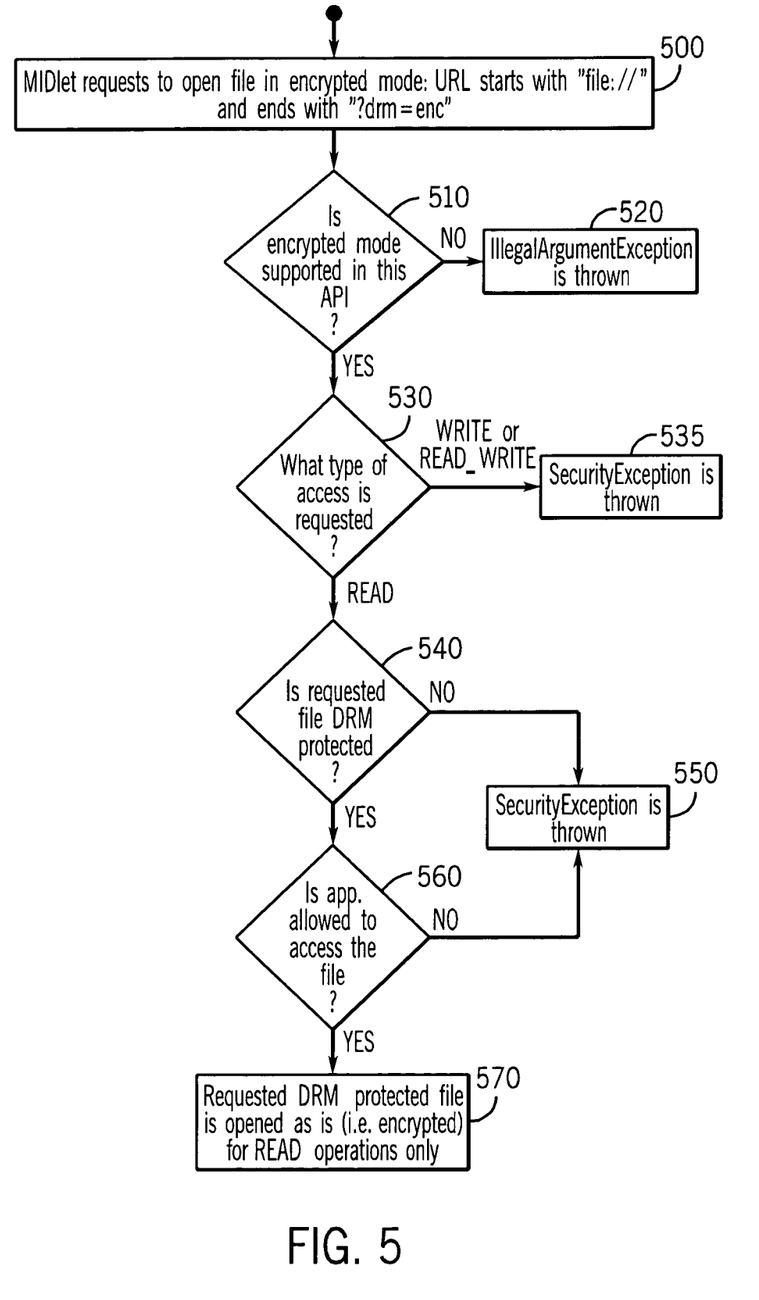
FIG. 5 is a flow chart showing the decision-making process involved in a situation where an application requests access in encrypted mode to a file or a plurality of files according to one embodiment of the invention.

A flow chart depicting the decision-making process for when an application requests access to a file in encrypted mode is shown in FIG. 5. At step 500, an application desires to open a file in an encrypted form. At step 510, it is determined whether the encrypted mode is supported by the particular API being used. If not, then at step 520 an IllegalAgrumentException is thrown. If the encrypted mode is supported, then at step 530 it is determined the type of access that is desired. If WRITE or READ_WRITE access is requested, then at step 535 a SecurityException is thrown. If READ access is requested, then at step 540 it is determined whether the file is DRM protected. If the file is not DRM protected, then at step 550 a SecurityException is thrown. If the file is DRM protected, then at step 560 it is determined whether the application is permitted to access the file. If it is so permitted, then at step 570 the requested DRM protected file is opened in encrypted form for READ operations only. If the application is not permitted to access the file, then the SecurityException is thrown at step 550.

The following is an example of how one embodiment of the present invention operates when it is desired to read a file in a default mode. When an application attempts to open a protected file using either a normal file URL or a file URL that ends with "?drm=preview" or another "preview" code, this is interpreted by the system as a request to open a file in the default mode. Two such examples of URLs are as follows:
file:///E:/images/cat.jpg
file:///E:/sounds/mew.mp3?drm=preview If a URL used for the request points to an unprotected file, and if the security policy of the mobile device allows the application to access this file, the system opens the file. In this situation, if the URL ends with the "preview" parameter, the parameter is ignored.

If the URL used for the request points to a protected file, and if the security policy of the mobile device allows the application to access this file, then the system either does not grant access at all, or the system opens the file for reading the content in the plain text form (similar to the decrypted mode depicted in FIG. 4). In this case, for "unsafe" APIs, access to DRM protected files in plain text form is not granted. "Unsafe" APIs are those APIs that allow the application to obtain the decrypted content of DRM protected files, thus creating an opportunity for leakage of the protected content. If access to a protected file is denied, a java.lang.SecurityException is thrown. Also, the access in default mode is granted only in APIs that provide applications with only a consumption mode for the file contents (e.g., a mode that corresponds to the DRM permission "play"). This restriction exists because the DRM agent needs to know which OMA DRM permission to check.

If a URL ends with a "preview" code and points to a DRM protected file, this is interpreted by the system as an indication that the application is not going to consume the content of the file. In this case, if the protected file has a <count> constraint in a relevant permission (or some other constraint that limits the number of times the file may be opened), the DRM agent does not decrease the counter. As discussed previously, this is necessary because, in certain situations, an application needs to manipulate the content but the manipulation does not qualify as actual consumption of the file's content. Conversely, if a URL does not end with a "preview" code, and if the target file or files has a permission with a <count> constraint, the DRM agent decreases the counter. This means that the default behavior in the default mode is to decrease the counter, and the application needs to explicitly specify when the counter should not be decreased.

As discussed above, if a URL that ends with "?drm=preview" or a similar preview code points to a non-protected file, the "?preview" parameter is ignored. Also as discussed previously, the described "preview" mechanism is not available to applications that do not belong to the manufacturer security domain. If such an application includes a "preview" code in a file URL, a java.lang.IllegalArgumentException is thrown.

Figure 6A:
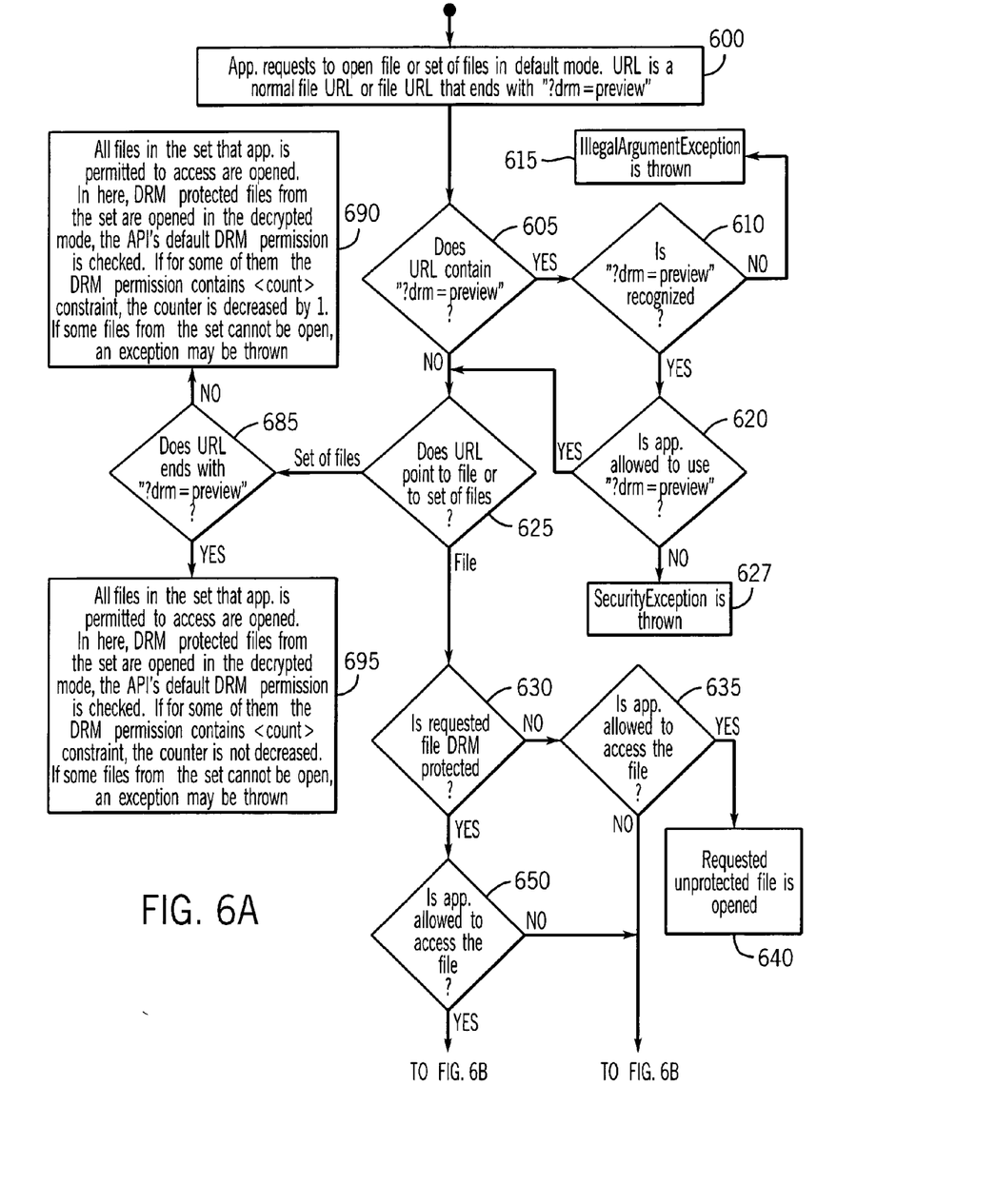
FIG. 6 is a flow chart showing the decision-making process involved in a situation where an application requests access in default mode to a file or a plurality of files according to one embodiment of the invention.
Figure 6B:
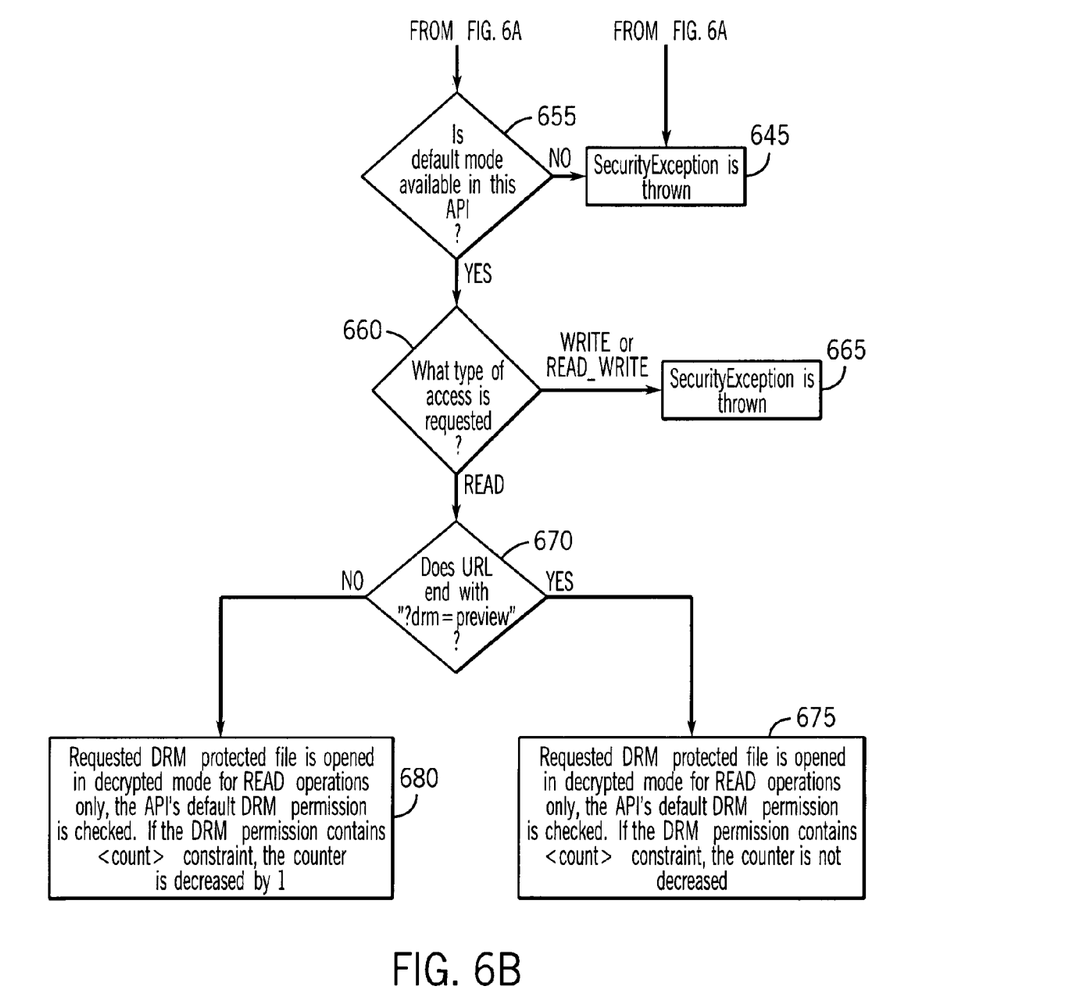

A flow chart depicting the decision-making process for having an application access a file in default mode is shown in FIG. 6. At step 600, an application requests that a file or a set of files be opened in the default mode. At step 605, it is determined whether the URL at issue includes a "preview" code. If such a preview code is included in the URL, then at step 610 it is determined whether this preview code is recognized. If the code is not recognized, then an IllegalArgumentException is thrown at step 615. If the preview code is recognized, then at step 620 it is determined whether the application is permitted to use the preview code. If not, then a SecurityException is thrown at step 627.

If the application is permitted to use the preview code, or if, returning to step 605, the URL does not include any preview code at all, then it is determined at step 625 whether the URL points to a single file or to a set of files. If the URL points to a single file, then at step 630 it is determined whether the requested file is DRM protected. If the file is not DRM protected, it is determined whether the application is permitted to access the file at step 635. If the application is so permitted, then the requested, unprotected file is opened at step 640. If the application is not permitted to access the file, then a SecurityException is thrown at step 645.

Returning to step 630, if the requested file is DRM protected, then at step 650 it is determined whether the application is permitted to access the file. If not, then the SecurityException is thrown at step 645. If the application is permitted to access the file, then, at step 655, it is determined whether the default mode is available in the particular API at issue. If the default mode is not available, then a SecurityException is thrown at step 645. If the default mode is available, then the type of access being requested is determined at step 660. If WRITE or READ_WRITE access is requested, then a SecurityException is thrown at step 665. If READ access is requested, then at step 670 it is determined whether the URL includes a "preview" code. If there is a preview code, then the requested DRM protected file is opened in decrypted form for READ operations only at step 675. If the DRM permission contains a <count> constraint or a similar constraint that prevents the file from being opened ore than a predetermined number of times, the counter is not decreased. If there is no preview code, then the requested DRM protected file is opened in decrypted form for READ operations only at step 680. If the DRM permission contains a <count> constraint, the counter is decreased by one.

Returning to step 625, if the URL points to a set of files, it is then determined whether the URL includes a "preview" code. If there is no such code, then at step 690, each file in the set that the application is permitted to access is opened. In this situation, DRM protected files from the set are opened in the decrypted mode. If any of these files includes a <count> constraint, then the counter is decreased by one. If some files from the set cannot be opened, then an exception may also be thrown. If there is a preview code in the URL, on the other hand, then each file in the set that the application is permitted to access is also opened at step 695. In this situation, DRM protected files from the set are opened in the decrypted mode. If any of these files includes a <count> constraint, then the counter is not decreased. If some files from the set cannot be opened, then an exception may also be thrown. It should be noted that, for steps 690 and 695, each individual file may undergo the same decision-making process as is depicted in steps 630 through 680.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
   transmitting a request to an application program interface, wherein the application program interface is a Java application program interface or is derived from a Java application program interface, to permit a requesting program to access at least one file in a specific form if the application program interface is not configured to identify the file being in the specific form, the request comprising one or more digital rights management (DRM) parameters added to the uniform resource locator that identifies the at least one file, the one or more DRM parameters specifically identifying the file being in the specific form selected from the group consisting of an encrypted form, a decrypted form and a default form, wherein the DRM parameters comprise at least one of PREVIEW, DEC or PURPOSE;

determining whether the specific form is supported by the application program interface being used by the system;

determining whether the at least one file is protected;

determining whether the requesting program is permitted to access the at least one file; and based on the determinations that the specific form is supported by the application program interface, the at least one file is protected, and the requesting program is permitted to access the at least one file, opening the at least one file in the specific form for use by the requesting program.

2. The method of claim 1, further comprising, if the specific form is not supported by the application program interface, transmitting an exception.

3. The method of claim 1, further comprising, if the requesting program is not permitted to access the at least one file, transmitting a security-related exception.

4. The method of claim 1, further comprising, if the at least one file is not protected, and if the requesting program is permitted to access the file, opening the at least one file for use by the requesting program.

5. The method of claim 1, wherein the at least one file is opened for READ operations only.

6. The method of claim 1, further comprising, if the requesting program requests WRITE or READ_WRITE access to the at least one file, transmitting an exception instead of opening the at least one file.

7. The method of claim 1, wherein the at least one file comprises a single file.

8. The method of claim 1, wherein the at least one file comprises a plurality of files, and wherein each of the plurality of files where the specific form is supported by the application program interface, the at least one file is protected, and the requesting program is permitted to access the at least one file, is opened the in the specific form for use by the requesting program.

9. The method of claim 1, further comprising:

determining whether the one or more DRM parameters comprise a preview code;

if the one or more DRM parameters comprise a preview code, determining whether the requesting program is permitted to utilize the preview code; and if the requesting program is permitted to utilize the preview code, opening the at least one file for use by the requesting program in a preview mode.

10. The method of claim 9, further comprising, if the requesting program is permitted to utilize the preview code, and if a permission for the at least one file includes a constraint on a number of times the at least one file may be opened, keeping the number of times that the at least one file can be opened unchanged.

11. The method of claim 9, further comprising, if the one or more DRM parameters do not comprise a preview code, and if a permission for the at least one file includes a constraint on a number of times the at least one file may be opened, decreasing by one the number of times that the at least one file can be opened.

12. The method of claim 9, further comprising, if the one or more DRM parameters comprise a preview code, but the requesting program is not permitted to utilize the preview code, transmitting an exception.

13. A computer program product, embodied on a non-transitory computer-readable medium, accessing content on an electronic device, comprising:

computer code transmitting a request to an application program interface, wherein the application program interface is a Java application program interface or is derived from a Java application program interface, to permit a requesting program to access at least one file in a specific form if the application program interface is not configured to identify the file being in the specific form, the request comprising one or more digital rights management (DRM) parameters added to the uniform resource locator that identifies the at least one file, the one or more DRM parameters specifically identifying the at least one file being in the specific form selected from the group consisting of an encrypted form, a decrypted form and a default form, wherein the DRM parameters comprise at least one of PREVIEW, DEC or PURPOSE;

computer code determining whether the specific form is supported by the application program interface being used by the system;

computer code determining whether the at least one file is protected;

computer code determining whether the requesting program is permitted to access the at least one file; and computer code, based on the determinations that the specific form is supported by the application program interface, the at least one file is protected, and the requesting program is permitted to access the at least one file, opening the at least one file in the specific form for use by the requesting program.

14. The computer program product of claim 13, further comprising:

computer code for determining whether the one or more DRM parameters comprise a preview code;

computer code for, if the one or more DRM parameters comprise a preview code, determining whether the requesting program is permitted to utilize the preview code; and computer code for if the requesting program is permitted to utilize the preview code, opening the at least one file for use by the requesting program in a preview mode.

15. The computer program product of claim 13, further comprising computer code for, if the requesting program is permitted to utilize the preview code, and if a permission for the at least one file includes a constraint on a number of times the at least one file may be opened, keeping the number of times that the at least one file can be opened unchanged.

16. The computer program product of claim 13, further comprising computer code for, if the one or more DRM parameters do not comprise a preview code, and if a permission for the at least one file includes a constraint on a number of times the at least one file may be opened, decreasing by one the number of times that the at least one file can be opened.

17. An apparatus, comprising:

at least one processor; and at least one memory including computer program code, the at least one memory and the computer program code configured to, working with the at least one processor, cause the apparatus to at least:

transmit a request to an application program interface, wherein the application program interface is a Java application program interface or is derived from a Java application program interface, to permit a requesting program to access at least one file in a specific form if the application program interface is not configured to identify the file being in the specific form, the request comprising one or more digital rights management (DRM) parameters added to the uniform resource locator that identifies the at least one file, the one or more DRM parameters specifically identifying the at least one file being in the specific form selected from the group consisting of an encrypted form, a decrypted form and a default form, wherein the DRM parameters comprise at least one of PREVIEW, DEC or PURPOSE;

determine whether the specific form is supported by the application program interface being used by the system;

determine whether the at least one file is protected;

determine whether the requesting program is permitted to access the at least one file; and based on the determinations that the specific form is supported by the application program interface, the at least one file is protected, and the requesting program is permitted to access the at least one file, open the at least one file in the specific form for use by the requesting program.

18. The apparatus of claim 17, wherein the at least one memory and the computer program code configured to, working with the at least one processor, cause the apparatus to:

determine whether the one or more DRM parameters comprise a preview code;

if the request includes a preview code, determine whether the requesting program is permitted to utilize the preview code; and if the requesting program is permitted to utilize the preview code, open the at least one file for use by the requesting program in a preview mode.

19. A module, comprising:
a processor configured to process information; and
a memory, including:
computer code transmitting a request to an application program interface, wherein the application program interface is a Java application program interface or is derived from a Java application program interface, to permit a requesting program to access at least one file in a specific form if the application program interface is not configured to identify the file being in the specific form, the request comprising one or more digital rights management (DRM) parameters added to the uniform resource locator that identifies the at least one file, the one or more DRM parameters specifically identifying the at least one file being in the specific form selected from the group consisting of an encrypted form, a decrypted form and a default form, wherein the DRM parameters comprise at least one of PREVIEW, DEC or PURPOSE;

computer code determining whether the specific form is supported by the application program interface being used by the system;

computer code determining whether the at least one file is protected;

computer code determining whether the requesting program is permitted to access the at least one file; and computer code, based on the determinations that the specific form is supported by the application program interface, the at least one file is protected, and the requesting program is permitted to access the at least one file, opening the at least one file in the specific form for use by the requesting program.

20. The module of claim 19, wherein the memory further includes:

computer code for determining whether the one or more DRM parameters comprise a preview code;

computer code for, if the request includes a preview code, determining whether the requesting program is permitted to utilize the preview code; and computer code for, if the requesting program is permitted to utilize the preview code, opening the at least one file for use by the requesting program in a preview mode.

* * * * *